United States Patent
Zhang et al.

(10) Patent No.: US 12,470,519 B2
(45) Date of Patent: Nov. 11, 2025

(54) INTRA-VLAN TRAFFIC FILTERING IN A DISTRIBUTED WIRELESS NETWORK

(71) Applicant: Hewlett Packard Enterprise Development LP, Spring, TX (US)

(72) Inventors: Haifeng Zhang, Beijing (CN); Hao Lu, Fremont, CA (US); Xuanhe Zhang, Beijing (CN); Hong Song, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 250 days.

(21) Appl. No.: 18/090,053

(22) Filed: Dec. 28, 2022

(65) Prior Publication Data
US 2024/0223532 A1    Jul. 4, 2024

(51) Int. Cl.
*H04L 9/40*    (2022.01)
(52) U.S. Cl.
CPC ...... *H04L 63/0236* (2013.01); *H04L 63/0876* (2013.01); *H04L 63/1466* (2013.01)
(58) Field of Classification Search
CPC ............. H04L 63/0236; H04L 63/0876; H04L 63/1466; H04L 63/101
See application file for complete search history.

(56) References Cited

U.S. PATENT DOCUMENTS

| | | | |
|---|---|---|---|
| 8,763,082 B2 | 6/2014 | Huber et al. | |
| 8,996,603 B2 | 3/2015 | Burshan et al. | |
| 9,369,434 B2 | 6/2016 | Kim et al. | |
| 11,283,754 B2 * | 3/2022 | Peterson | H04L 41/0213 |
| 2018/0234339 A1 * | 8/2018 | Uchizumi | H04L 61/5014 |
| 2021/0344714 A1 * | 11/2021 | Yang | H04L 12/4641 |

FOREIGN PATENT DOCUMENTS

WO    WO-2005057233 A2 *    6/2005    ............... H04K 3/65

* cited by examiner

*Primary Examiner* — Linglan Edwards
*Assistant Examiner* — Saron Matthewos Worku
(74) *Attorney, Agent, or Firm* — Yao Legal Services, Inc.

(57) ABSTRACT

An access point (AP) in an AP cluster is provided. During operation, the AP can identify a set of Internet Protocol (IP) addresses of permitted devices in a virtual local area network (VLAN) of the AP cluster from a first set of packets. The AP can also identify a set of media access control (MAC) addresses corresponding to the set of IP addresses from a second set of packets. The AP can then generate a whitelist comprising the sets of IP and MAC addresses. The whitelist can indicate addresses of packets permitted to be forwarded via the wireless interface. The AP can identify a target IP address in an Address Resolution Protocol (ARP) request. If the target IP address is absent in the whitelist, the AP can preclude the wireless interface from forwarding the ARP request to clients wirelessly coupled to the wireless interface.

19 Claims, 8 Drawing Sheets

INTRA-VLAN TRAFFIC FILTERING IN A DISTRIBUTED WIRELESS NETWORK

BACKGROUND

Field

The present disclosure relates to communication networks. More specifically, the present disclosure relates to a method and system for efficiently filtering traffic within a virtual local area network (VLAN) at a wireless access point (AP) of a wireless network.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities, such as providing a distributed wireless network (DWN). A group of APs may operate in conjunction with each other to support the DWN. The group of APs can provide the same Service Set Identifier (SSID) and the same virtual local area network (VLAN) for the client devices (e.g., a host or an end device). Since a client device can wirelessly couple to any of the APs and can join the VLAN, client devices belonging to the VLAN can be distributed among multiple APs.

The DWN can be managed with a controller (e.g., a physical or virtual controller, or a cloud management platform), which can provision and control a respective AP of the network. Consequently, an AP can synchronize the information associated with a respective locally coupled client device with the controller. In some configurations, the AP may forward traffic from the client device to the controller. The DWN can also be managed from within the DWN (e.g., by an AP selected based on a distributed election process). For example, the group of APs can form a cluster that provides wireless connectivity. For a respective VLAN, one of the APs can operate as a conductor that facilitates the network management for the APs that support the VLAN. Under such a deployment, a respective AP can forward a packet received from a local wireless interface to its destination (e.g., via a gateway), thereby ensuring distributed forwarding of traffic. Since a VLAN may span multiple APs and an individual AP may not know all client devices of the VLAN, VLAN-level traffic filtering at an AP can be challenging.

The aspects described herein solve the problem of filtering potentially malicious intra-VLAN traffic in a DWN by (i) automatically learning respective Internet Protocol (IP) and media access control (MAC) addresses of essential devices in a VLAN from the control traffic from client devices at an AP; (ii) generating a whitelist of the learned IP and MAC addresses; and (iii) dropping all intra-VLAN packets with a destination IP or MAC address absent in the whitelist at the AP. Hence, a client device in the VLAN can only send traffic to the essential devices, such as the default gateway and the domain name system (DNS) server. If the client device tries to send malicious traffic to another client device in the VLAN, the AP can drop the traffic and provide an efficient filtering mechanism for intra-VLAN traffic.

With existing technologies, the cluster of APs in the DWN can provide the same SSID and the same VLAN for the client devices. As a result, a malicious device may try to access the information from a target client device coupled to the DWN. The distributed architecture allows the malicious device to be present in the VLAN by coupling to any of the APs of the cluster. In particular, if the DWN is deployed as a public network (e.g., in airports, hotels, supermarkets, etc.), it can be challenging to prevent the malicious device from connecting to the DWN as a client device. To mitigate this issue, it can be preferable to avoid communication between client devices of the VLAN within the cluster (i.e., intra-VLAN traffic) to prevent the malicious device from gaining access to the client device.

If the malicious device and the target device are wirelessly coupled to the same AP (i.e., under the coverage of the same AP), the AP can obtain and maintain the client information, such as the VLAN membership of a device, associated with both devices. Upon receiving a packet from the malicious device, the AP can determine that the source and destination MAC addresses of the packet are for locally coupled client devices. Accordingly, the AP can check the VLAN memberships associated with the MAC addresses, which can be learned based on layer-2 MAC address learning. If the malicious device and the target device are on the same VLAN, the AP can drop the packet, thereby filtering intra-VLAN client traffic in the DWN.

However, in a DWN, the malicious device may not be wirelessly coupled to the AP that provides wireless connectivity to the target device. Under such circumstances, an individual AP may not have relevant client information. As a result, the AP may not be able to determine whether to filter the packet. In other words, because an AP may not know the presence of a client device coupled with another AP, the AP may not be capable of detecting whether a connection request is from within the same cluster. Furthermore, if the DWN supports a large number of client devices, sharing and maintaining the client information of all devices of the DWN may require significant network bandwidth and local storage capacity. In addition, traversing such a large volume of information for filtering a respective packet can also require extensive processing resources at a respective AP.

To solve this problem, when a client device wirelessly couples to an AP (i.e., joins the coverage of the AP) of the DWN, the AP can automatically learn the IP addresses of a set of essential devices of the VLAN, which can correspond to subnet, from the initial discovery packets exchanged by the client device. The initial discovery packets can be the initial Dynamic Host Configuration Protocol (DHCP) handshake packets exchanged with the client device. The essential devices can include the default gateway switch of the cluster and the domain name system (DNS) server of the DWN. In particular, the DHCP acknowledge (ACK) packet of the handshake can include the IP addresses of the gateway switch and DNS server in corresponding fields. When the AP receives the DHCP ACK packets, the AP can identify the packets based on the header. Since which field of the packet stores which IP address is already known, the AP can learn the IP addresses of the essential devices from the fields.

The AP can then store these IP addresses in an entry in a local data structure, which can operate as a whitelist of IP addresses that are allowed to exchange intra-VLAN traffic. The data structure can be referred to as a discovery table. The AP can also learn the MAC addresses of the essential devices from respective Address Resolution Protocol (ARP) response packets. When the AP receives an ARP response packet, if the AP determines that the sender IP address field of the ARP response packet is in the discovery table, the AP learns the MAC address in the sender MAC address field. The AP can then store the MAC address in association with the IP address in the discovery table. An administrator may also manually add other IP and MAC addresses, such as a public printer address, that are in the same VLAN to the discovery table.

Based on the learning and manual entries, the AP can populate a whitelist of IP and MAC addresses that are allowed to exchange intra-VLAN traffic. Hence, the essential devices can also be referred to as permitted devices. If the AP receives a connection or ARP request packet sent to a destination IP or MAC address that is not present in the discovery table via the wireless interface, the AP can drop the packet. In this way, the discovery table allows a respective client device to communicate with the essential devices and any other manually added device in the VLAN while blocking other intra-VLAN traffic. This traffic-filtering technique can efficiently isolate peer-to-peer communication in the VLAN without requiring significant memory and processing overhead.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1:
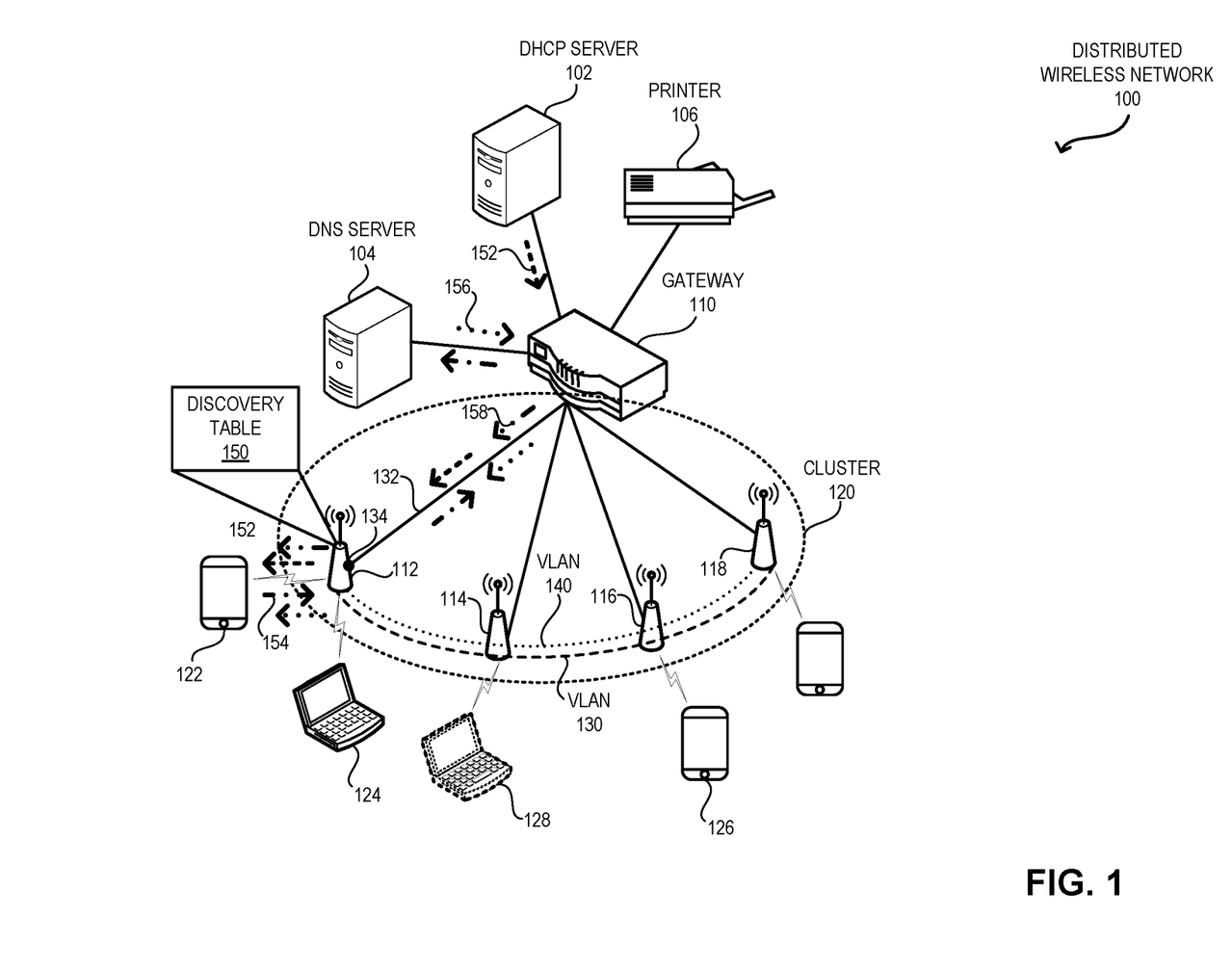
FIG. 1 illustrates an example of a wireless network supporting intra-VLAN traffic filtering at an AP, in accordance with an aspect of the present application.

FIG. 1 illustrates an example of a wireless network supporting intra-VLAN traffic filtering at an AP, in accordance with an aspect of the present application. A DWN 100 can include a cluster of APs 120. A respective AP can be coupled to a gateway switch 110 via a corresponding backhaul link. A backhaul link can be a wired link (e.g., an optical cable) or a wireless link (e.g., a point-to-point wireless link). Cluster 120 can include a number of APs 112, 114, 116, and 118. Cluster 120 can provide the same SSID and a same VLAN 130 across APs 112, 114, 116, and 118. A number of client devices 122, 124, and 126 can wirelessly couple to cluster 120. A respective client can obtain an IP address from a subnet associated with VLAN 130.

A client device can be any device capable of establishing a wireless connection using wireless technology (e.g., Wi-Fi, cellular, Bluetooth, line-of-sight optical, infrared, etc.). For example, devices 122 and 124 can wirelessly couple to AP 112, and device 126 can wirelessly couple to AP 116. In DWN 100, APs 112, 114, 116, and 118 can be coupled to each other via a management VLAN 140. A respective AP can share its information with other APs via VLAN 140. In this way, AP 112 can learn the respective IP addresses of APs 114, 116, and 118 via VLAN 140. AP 112 can then reframe from adding the respective IP addresses of APs 114, 116, and 118 from adding to the local whitelist.

Since VLAN 130 can be available at any of the APs of cluster 120, a malicious device 128 (shown with dotted lines in FIG. 1) may try to access the information from target client device 122, 124, and 126 via any of the APs. The distributed architecture of DWN 100 can allow device 128 to be present in VLAN 130 by coupling to another AP 114. In particular, if DWN 100 is deployed as a public network (e.g., in airports, hotels, supermarkets, etc.), it can be challenging to prevent device 128 from connecting to DWN 100 as a client device via cluster 120. To mitigate this issue, it can be preferable to avoid communication between client devices in VLAN 130 (i.e., intra-VLAN traffic within cluster 120) to prevent device 128 from gaining access to client device 122, 124, or 126.

Since AP 112 does not provide wireless connectivity to malicious device 128, AP 112 may not have relevant client information. As a result, AP 112 may not be able to determine whether to filter a malicious packet from device 128. In other words, because AP 112 may not know the presence of device 128 coupled to AP 114, AP 112 may not be capable of detecting whether a connection request is from within cluster 120. Furthermore, if DWN 100 supports a large number of client devices, sharing and maintaining the client information of all client devices among APs 112, 114, 116, and 118 may require significant network bandwidth and local storage capacity. In addition, traversing such a large volume of information for filtering a respective packet can also require extensive processing resources at a respective AP of cluster 120.

To solve this problem, when device 122 wirelessly couples to AP 112 (i.e., joins the coverage of AP 112), AP 112 can automatically learn the IP addresses of a set of essential devices of VLAN 130 (and its corresponding subnet) from the initial discovery packets exchanged by device 122. The initial discovery packets can be the initial DHCP handshake packets exchanged with device 122. The essential devices can include the default gateway (e.g., gateway switch 110) of VLAN 130 and a DNS server 104 of DWN 100. As a part of the DHCP handshake process, device 122 can receive a DHCP ACK packet 152 from DHCP server 102 via AP 112.

Upon receiving packet 152 from server 102, AP 112 can identify packet 152 as a DHCP ACK packet. Since which field of the packet stores which IP address is already known, AP 112 can obtain the respective IP addresses of switch 110 and server 104 from corresponding fields (e.g., based on packet snooping). If there are multiple DNS servers indicated in packet 152, AP 112 may select the DNS IP address that is in the same subnet as gateway switch 110. AP 112 can then store these IP addresses in an entry in a local data structure, a discovery table 150, that can operate as a whitelist of IP addresses that are allowed to exchange intra-VLAN traffic via cluster 120.

In addition, since uplink ports of the APs in cluster 120 do not provide wireless access to a client device, APs 112, 114, 116, and 118 can configure their respective uplink port as a trusted port. For example, AP 112 can configure uplink port 134, which couples AP 112 to gateway switch 110 via a backhaul link 132, as a trusted port that is allowed to exchange traffic over VLAN 130. In particular, since port 134 is not configured to serve any particular client, port 134 can be configured as a trusted port by default. AP 112 may not apply traffic filtering using discovery table 150 on port 134. As a result, AP 112 can forward ARP and connection requests to upstream devices via port 134, thereby allowing devices 122 to access the Internet.

AP 112 can also learn the MAC addresses of the default gateway of VLAN 130 (e.g., a MAC address of switch 110) and server 104 from respective ARP response packets. For example, to determine the MAC address of DNS server 104, device 122 can send an ARP request packet 154 with the IP address of server 104 as the target IP address. Since the destination IP address of packet 154 can be in discovery table 150, AP 112 may distribute packet 154 via its wireless interface. Furthermore, AP 112 can forward packet 154 via port 134. Server 104 can receive packet 154 and sends a corresponding ARP response packet 156. When AP 112 receives packet 156, AP 112 can determine that the sender IP address field of packet 156 is in discovery table 150. Hence, AP 112 can learn the MAC address in the sender MAC address field of packet 156 and store the MAC address in association with the IP address of server 104 in discovery table 150.

Similarly, AP 112 can learn the MAC address in the sender MAC address field of an ARP response or gratuitous ARP (GARP) packet 158 from gateway 110. Subsequently, AP 112 can then store the MAC address in association with the IP address of gateway 110 in discovery table 150. Furthermore, an administrator may also manually add other IP and MAC addresses, such as the addresses of a public printer 106, that are in VLAN 130 to discovery table 150. AP 112 can also learn the MAC address of printer 106 from an ARP response. Based on the learning and manual entries, AP 112 can populate discovery table 150 as a whitelist of IP and MAC addresses that are allowed to exchange intra-VLAN traffic over VLAN 130. In the same way, APs 114, 116, and 118 can populate their respective whitelists.

If AP 112 receives a multi-destination ARP request packet with a target IP address that is not present in discovery table 150 via the wireless interface, AP 112 can drop the packet. Similarly, if AP 112 receives a unicast ARP packet with a destination MAC address and a target IP address that are not present in discovery table 150, AP 112 can drop the packet. In this way, discovery table 150 allows a respective client device to communicate with the essential devices and any other manually added device in VLAN 130 while blocking other intra-VLAN traffic. This traffic-filtering technique can efficiently isolate peer-to-peer communication in VLAN 130 without requiring significant memory and processing overhead on AP 112. Here, the traffic-filtering technique can include three steps-learning IP addresses for discovery table 150, learning MAC addresses for discovery table 150, and applying traffic filtering using discovery table 150.

Figure 2A:
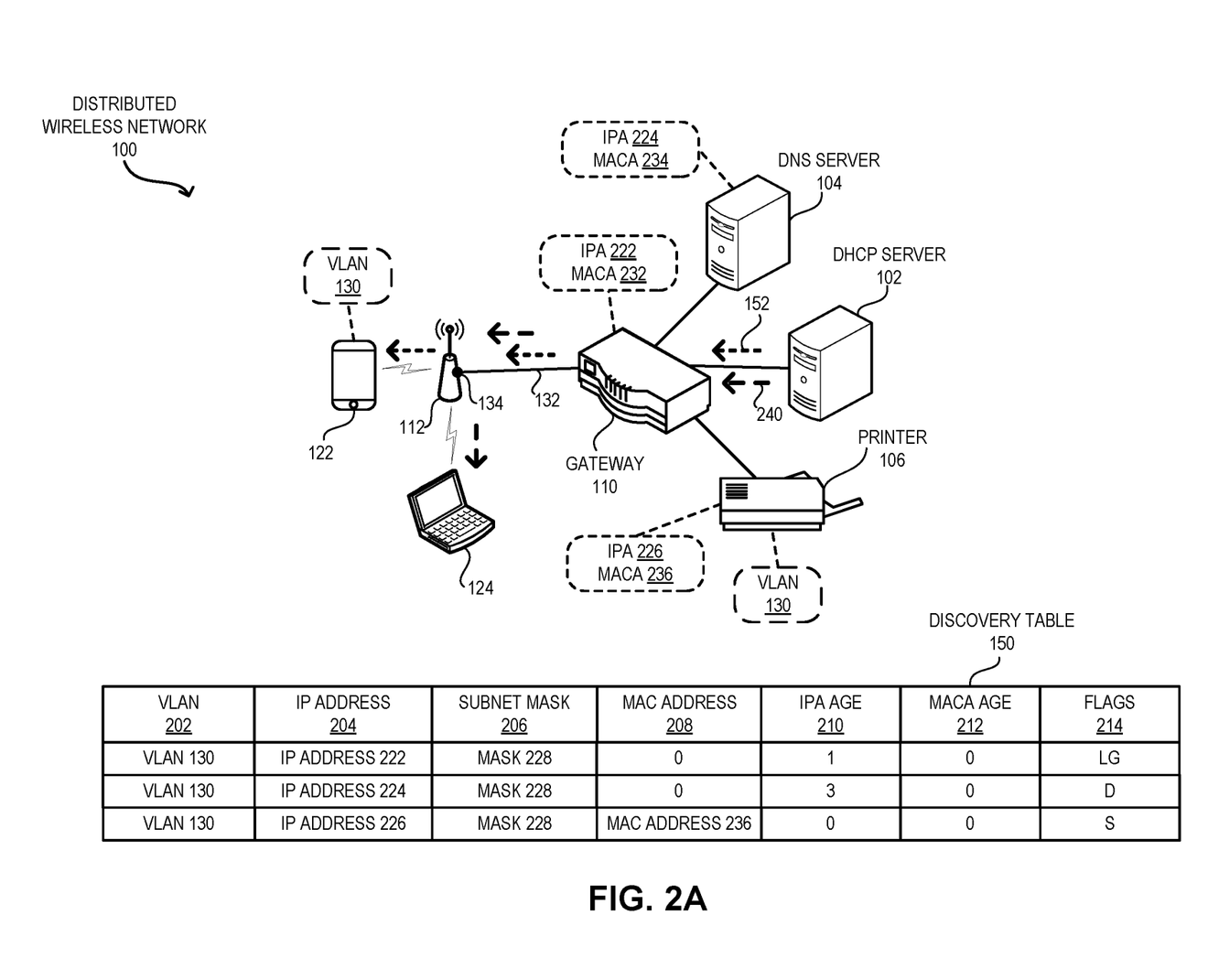
FIG. 2A illustrates an example of learning Internet Protocol (IP) addresses for generating a whitelist indicating permission for intra-VLAN traffic at an AP, in accordance with an aspect of the present application.

FIG. 2A illustrates an example of learning IP addresses for generating a whitelist indicating permission for intra-VLAN traffic at an AP, in accordance with an aspect of the present application. In this example, gateway 110, DNS server 104, and printer 106 can be assigned with IP addresses 222, 224, and 226, respectively. Furthermore, gateway 110, DNS server 104, and printer 106 can have MAC addresses 232, 234, and 236, respectively. VLAN 130 can include device 122 and printer 106. To efficiently populate discovery table 150, AP 112 can automatically learn IP addresses 222 and 224. Discovery table 150 can respective columns for a VLAN 202, an IP address 204, a subnet mask 206, a MAC address 208, an IP address age 210, a MAC address age 212, and a set of flags 214. Hence, a respective entry in discovery table 150 can include a value for these columns.

During operation, AP 112 can snoop DHCP ACK packets received from port 134, which can be a trusted port of AP 112. For example, AP 112 can receive DHCP ACK packet 152 via port 134. AP 112 can be programmed with a rule that can instruct the forwarding hardware of AP 112 to promote DHCP ACK packets for further processing (e.g., at the operating software of AP 112). Based on the header of packet 152, the forwarding hardware can match packet 152 with the rule and determine that packet 152 is a DHCP ACK packet. Subsequently, AP 112 can obtain information specified in a set of fields of packet 152. The set of fields can include respective IP address fields for DNS and the gateway switch (may be indicated as "router" in packet 152), and the subnet mask field.

Accordingly, AP 112 can obtain IP address 222 for gateway switch 110 and IP address 224 for server 104, and subnet mask 228 from packet 152. If multiple IP addresses are specified for server 104, AP 112 can pick IP address 224, which can be the subnet of IP address 222. AP 112 can then store IP addresses 222 and 224 in respective entries of discovery table 150 and include subnet mask 228 in the entries. In addition, because packet 152 is transferred over VLAN 130, AP 112 can indicate that the entries are for VLAN 130. AP 112 can also include an initial predefined value for the IP address age, which indicates whether the IP address information has timed out, for IP addresses 222 and 224. AP 112 can periodically decrement the IP address age.

Since packet 152 does not specify a MAC address, the entries can include a default value (e.g., a value of "0") for the MAC addresses. In the same way, the entries can include a default value (e.g., a value of "0") for the MAC address ages. A MAC address age of 0 can indicate that the corresponding MAC address has timed out. The flags for the entry of IP address 222 can indicate that IP address 222 is a local address (e.g., with a flag "L") and for a gateway (e.g., with a flag "G"). On the other hand, the flags for the entry of IP address 224 can indicate that IP address 224 is for a DNS server (e.g., with a flag "D"). These flags can allow AP 112 to identify the essential device associated with an IP address. Upon generating respective entries for IP addresses 222 and 224, AP 112 can forward packet 152 to device 122 via the wireless interface.

When another device 124 performs the DHCP handshake, server 102 can send a DHCP ACK packet 24 to device 124. When AP 112 receives packet 240, AP 112 can obtain information specified in the set of fields of packet 240. However, the obtained information, such as IP addresses 222 and 224, can already be in discovery table 150. AP 112 can then refresh the corresponding entries in discovery table 150 and increment the IP address ages in those entries by a predefined value. In this way, even though discovery table 150 is already populated for VLAN 130, AP 112 can continue to snoop DHCP ACK packets to refresh the entries. Upon refreshing the entries for IP addresses 222 and 224, AP 112 can forward packet 140 to device 124 via the wireless interface.

Furthermore, an administrator may also manually insert IP address 226 of printer 106, which is in VLAN 130, into an entry of discovery table 150. The flags for this entry can indicate that IP address 226 is statically entered (e.g., with a flag "S"). The administrator may also insert MAC address 236 into the entry with IP address 226. Alternatively, AP 112 can identify MAC address 236 in the sender MAC address field of an ARP response (or GARP) packet from printer 106 and insert MAC address 236 into the entry. Since the entry is statically entered, the entry may not time out, and can be removable by the administrator. Therefore, the IP and MAC address ages of the entry may include a "don't care" value and may not indicate when to time out.

Figure 2B:
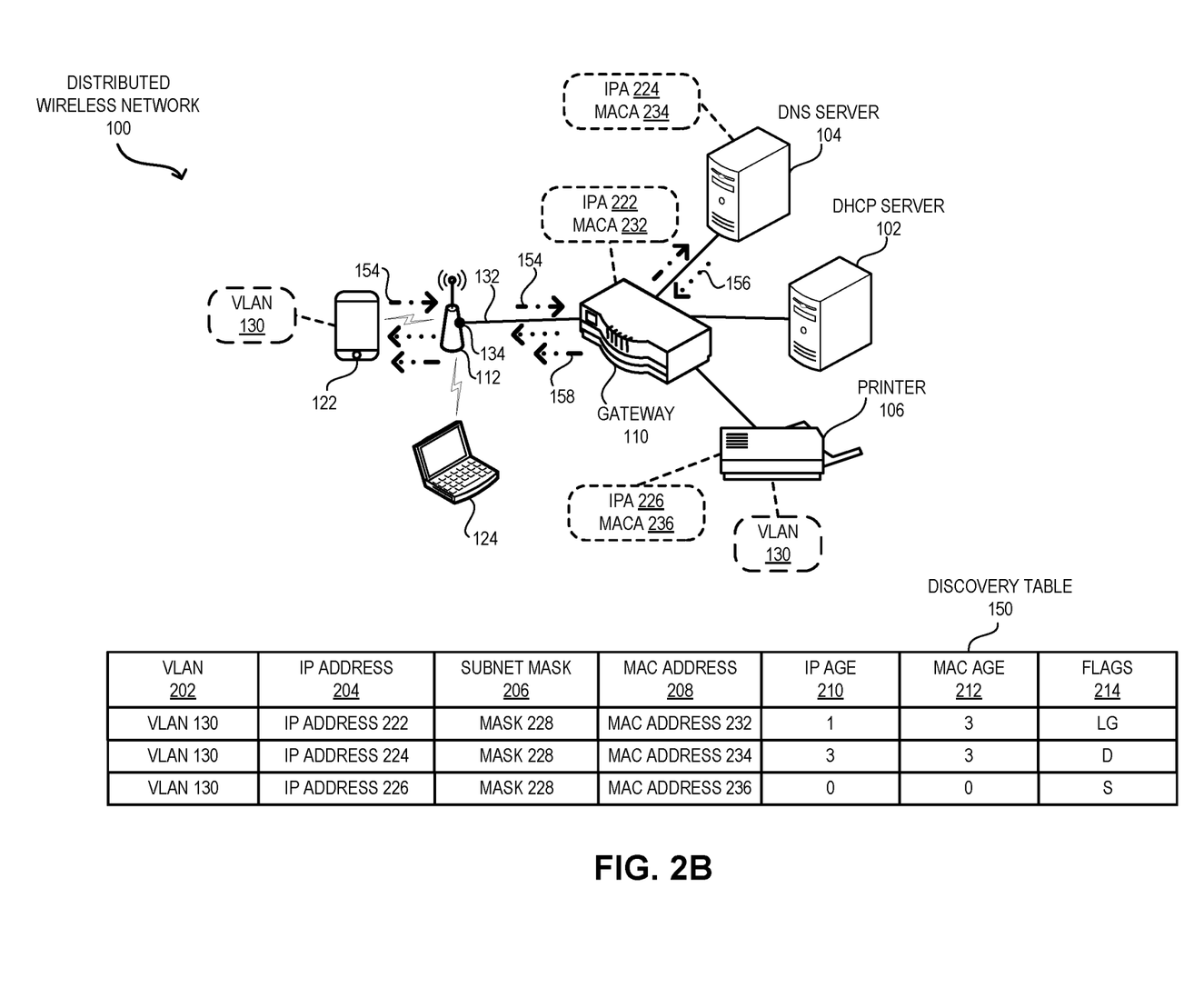
FIG. 2B illustrates an example of learning media access control (MAC) addresses for generating a whitelist indicating permission for intra-VLAN traffic at an AP, in accordance with an aspect of the present application.

Upon learning IP addresses, AP 112 can learn MAC addresses for discovery table 150. FIG. 2B illustrates an example of learning MAC addresses for generating a whitelist indicating permission for intra-VLAN traffic at an AP, in accordance with an aspect of the present application. AP 112 can learn MAC addresses associated with the IP addresses in discovery table 150 from ARP response or GARP packets received via port 134. During operation, AP 112 can snoop ACK packets received from port 134, which can be a trusted port of AP 112. To determine the MAC address of DNS server 104, device 122 can send an ARP request packet 154 with IP address 224 as the target IP address, respectively. AP 112 can then forward packet 154 via port 134 to server 104.

Server 104 can receive packet 154 and send a corresponding ARP response packet 156 with IP address 224 and MAC address 234 as the sender IP and MAC addresses, respectively. When AP 112 receives packet 156, AP determines that the sender IP address field of packet 156 is IP address 224, which is in discovery table 150. AP 112 can then learn MAC address 234 in the sender MAC address field of packet 156 and MAC address 234 in association with IP address 224 in discovery table 150. If another device, such as device 124 obtains an ARP response (or a GARP) from server 104, AP 112 can refresh the entry comprising MAC address 234 in discovery table 150 and increment the MAC address age. In this way, even though discovery table 150 is already populated for VLAN 130, AP 112 can continue to snoop ARP response or GARP packets to refresh the entries.

In addition, AP 112 can learn MAC address 232 in the sender MAC address field of an ARP response (or GARP) packet 158 from gateway 110. AP 112 can then store MAC address 232 in association with IP address 222 in discovery table 150. Upon learning the respective MAC addresses, AP 112 can forward packets 156 and 158 via its wireless interface. On the other hand, if AP 112 receives an ARP response or GARP packet with a sender IP address absent in discovery table 150, AP 112 can drop the packet. Furthermore, if MAC address 236 is not manually entered, MAC address 236 may not be stored in discovery table 150 when the entry comprising IP address 226 is inserted. AP 112 can then identify MAC address 236 in the sender MAC address field of an ARP response (or GARP) packet from printer 106. Subsequently, AP 112 can store MAC address 236 in association with IP address 226 in discovery table 150.

Figure 3:
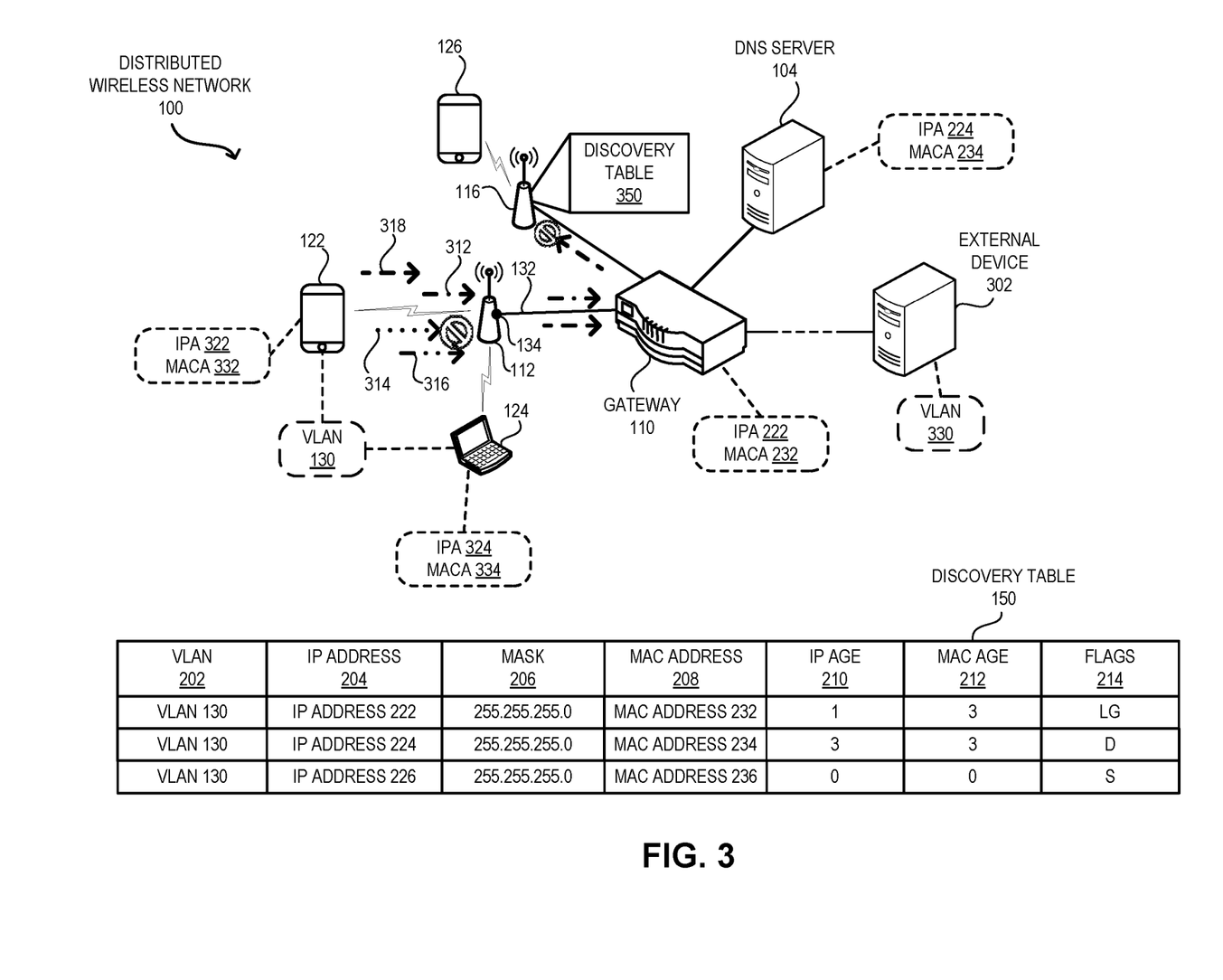
FIG. 3 illustrates an example of an AP forwarding traffic received from a wireless interface based on a whitelist, in accordance with an aspect of the present application.

AP 112 can then use discovery table to filter inter-VLAN traffic for VLAN 130. FIG. 3 illustrates an example of an AP forwarding traffic received from a wireless interface based on a whitelist, in accordance with an aspect of the present application. To communicate with another device in VLAN 130, device 122 can send a unicast or a multi-destination (e.g., a multicast or broadcast) packet (e.g., ARP or connection request packets). AP 112 can receive the packet from device 122, check against discovery table 150, and determine whether to forward or drop the packet. For example, to communicate with an external device 302, which can be in a different VLAN 330, device 122 can send an ARP request packet 312 that includes IP address 222 of gateway 110 as the target IP address via the wireless connection with AP 112. Since IP address 222 is present in discovery table 150, AP 112 can forward packet 312 via port 134.

On the other hand, to communicate with another device in VLAN 130, such as device 124, device 122 can send an ARP request packet 314 that includes IP address 324 of device 124 as the target IP address via the wireless connection with AP 112. AP 112 can search IP address 324 in the target IP address field of packet 314 in discovery table 150. AP 112 can then determine that IP address 324 is not present in discovery table 150 and drop packet 314 (denoted with a "block" sign). If a MAC address 334 of device 124 is known to device 122, device 122 may send a unicast packet 316 to device 124 via the wireless connection with AP 112. For a respective unicast packet received via the wireless interface, AP 112 can search the destination MAC address of the unicast packet in discovery table 150. Accordingly, upon receiving packet 316, AP 112 can search MAC address 334 in discovery table 150. AP 112 can then determine that MAC address 334 is not present in discovery table 150 and drop packet 316.

In addition, AP 112 may forward a multi-destination packet via a trusted port, such as port 134, and refrain from forwarding that packet via the local wireless interface. If device 122 sends a multi-destination packet 318, the source IP and MAC addresses of packet 318 can be IP address 322 and MAC address 332 of device 122. Upon receiving packet 318 over the wireless connection, AP 112 can forward packet 318 via port 134. However, AP 112 may not distribute packet 318 via the local wireless interface. Gateway 110 can receive packet 318 over link 132 and distribute packet 318 to a respective other AP coupled to gateway 110, such as AP 116.

For a respective multi-destination packet received via the wireless interface, AP 116 can search the source MAC address of the unicast packet in local discovery table 350. Accordingly, upon receiving packet 318, AP 116 can search MAC address 332, which can be the source MAC address of packet 318, in discovery table 350. AP 116 can then determine that MAC address 332 is not present in discovery table 150 and drop packet 318. In this way, a respective AP can efficiently isolate and filter peer-to-peer communication in VLAN 130 without requiring significant memory and processing overhead on the AP.

Figure 4A:
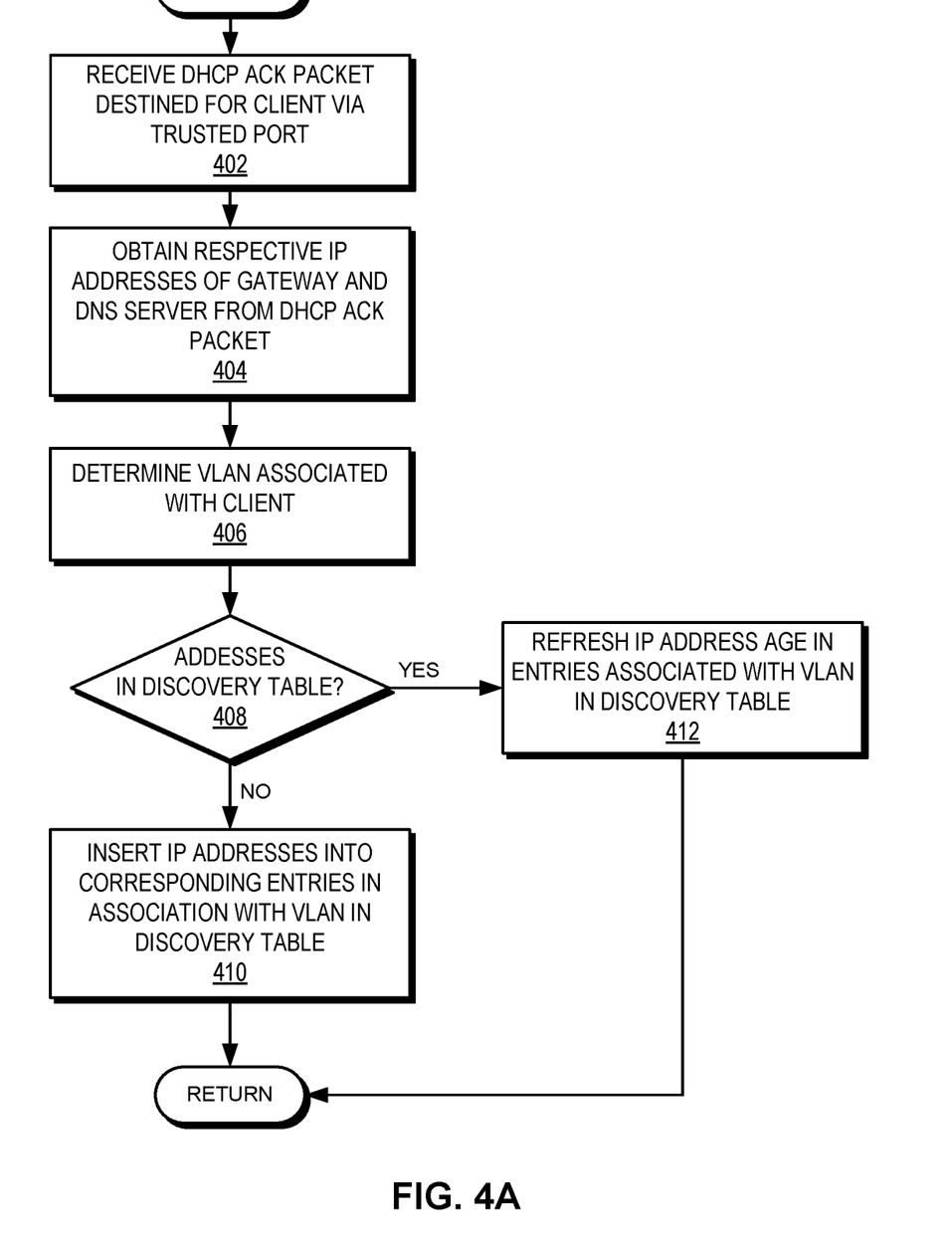
FIG. 4A presents a flowchart illustrating the process of an AP populating a whitelist comprising IP addresses with permission for intra-VLAN traffic, in accordance with an aspect of the present application.

FIG. 4A presents a flowchart illustrating the process of an AP populating a whitelist comprising IP addresses with permission for intra-VLAN traffic, in accordance with an aspect of the present application. During operation, the AP can receive a DHCP ACK packet destined for a client via a trusted port (operation 402). The AP can then obtain the respective IP addresses of the gateway and DNS server from the DHCP ACK packet (operation 404). Subsequently, the AP can determine a VLAN associated with the client (operation 406). The AP can determine the VLAN based on a local MAC address table or from a VLAN tag in the packet.

The AP can determine whether the IP addresses are in the discovery table (operation 408). If the IP addresses are in the discovery table, the AP can refresh the IP address age (e.g., increment the age value with a predetermined value) in the entries associated with the VLAN in the discovery table (operation 412). These entries can include the obtained IP addresses. On the other hand, if the IP addresses are not in the discovery table, the AP can insert the IP addresses into the corresponding entries in association with the VLAN in the discovery table (operation 410).

Figure 4B:
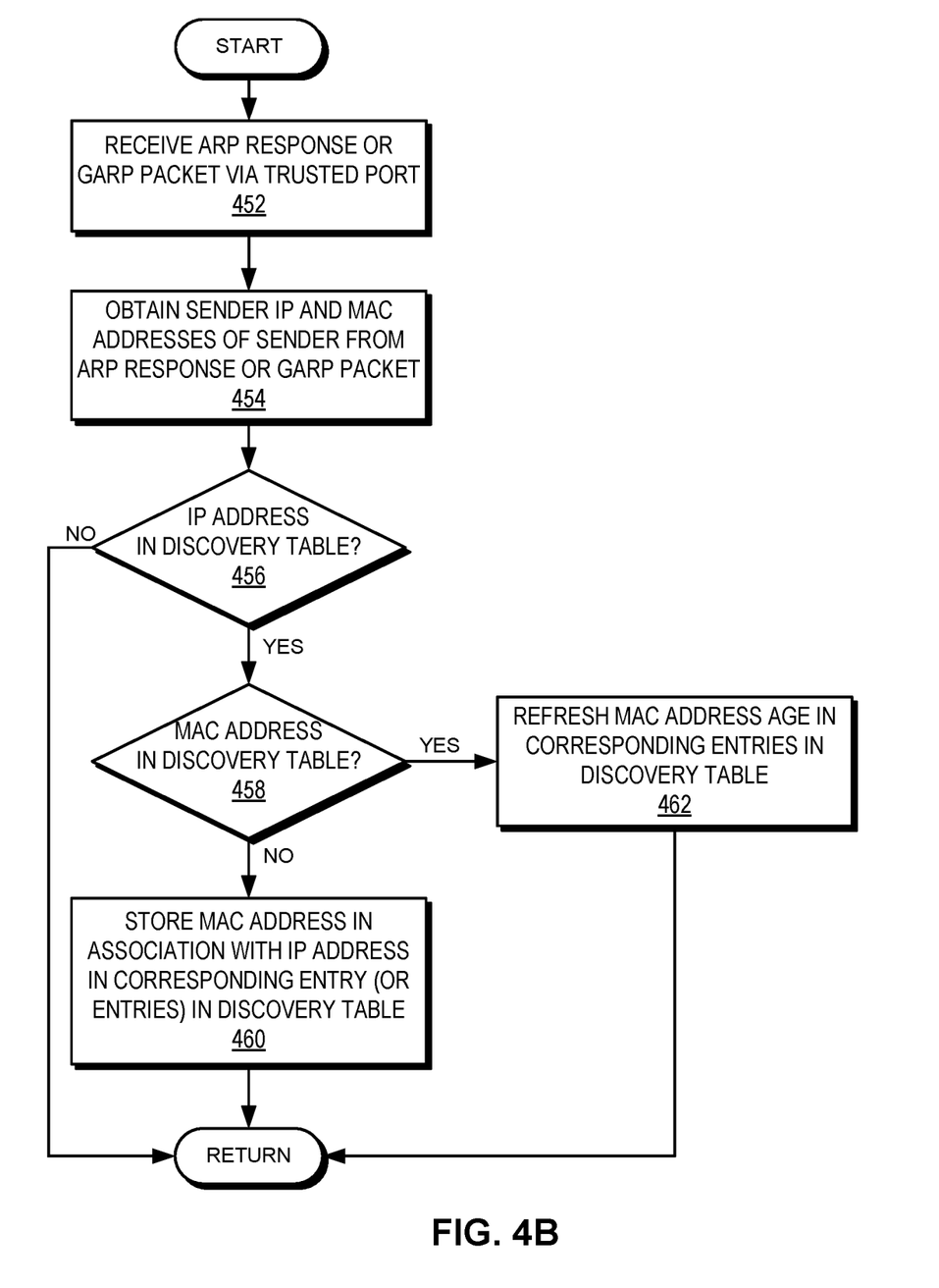
FIG. 4B presents a flowchart illustrating the process of an AP populating a whitelist comprising MAC addresses with permission for intra-VLAN traffic, in accordance with an aspect of the present application.

FIG. 4B presents a flowchart illustrating the process of an AP populating a whitelist comprising MAC addresses with permission for intra-VLAN traffic, in accordance with an aspect of the present application. During operation, the AP can receive an ARP response or GARP packet destined via a trusted port (operation 452). The AP can then obtain the sender IP and MAC addresses from the ARP response or GARP packet (operation 454). The AP can determine whether the IP address is in the discovery table (operation 456).

If the IP address is in the discovery table, the AP can determine whether the MAC address is in the discovery table (operation 458). If the MAC address is in the discovery table, the AP can refresh the MAC address age in the corresponding entries that include the MAC address in the discovery table (operation 462). On the other hand, if the MAC address is not in the discovery table, the AP can store the MAC address in association with the IP address in the corresponding entry (or entries) in the discovery table (operation 460).

Figure 5:
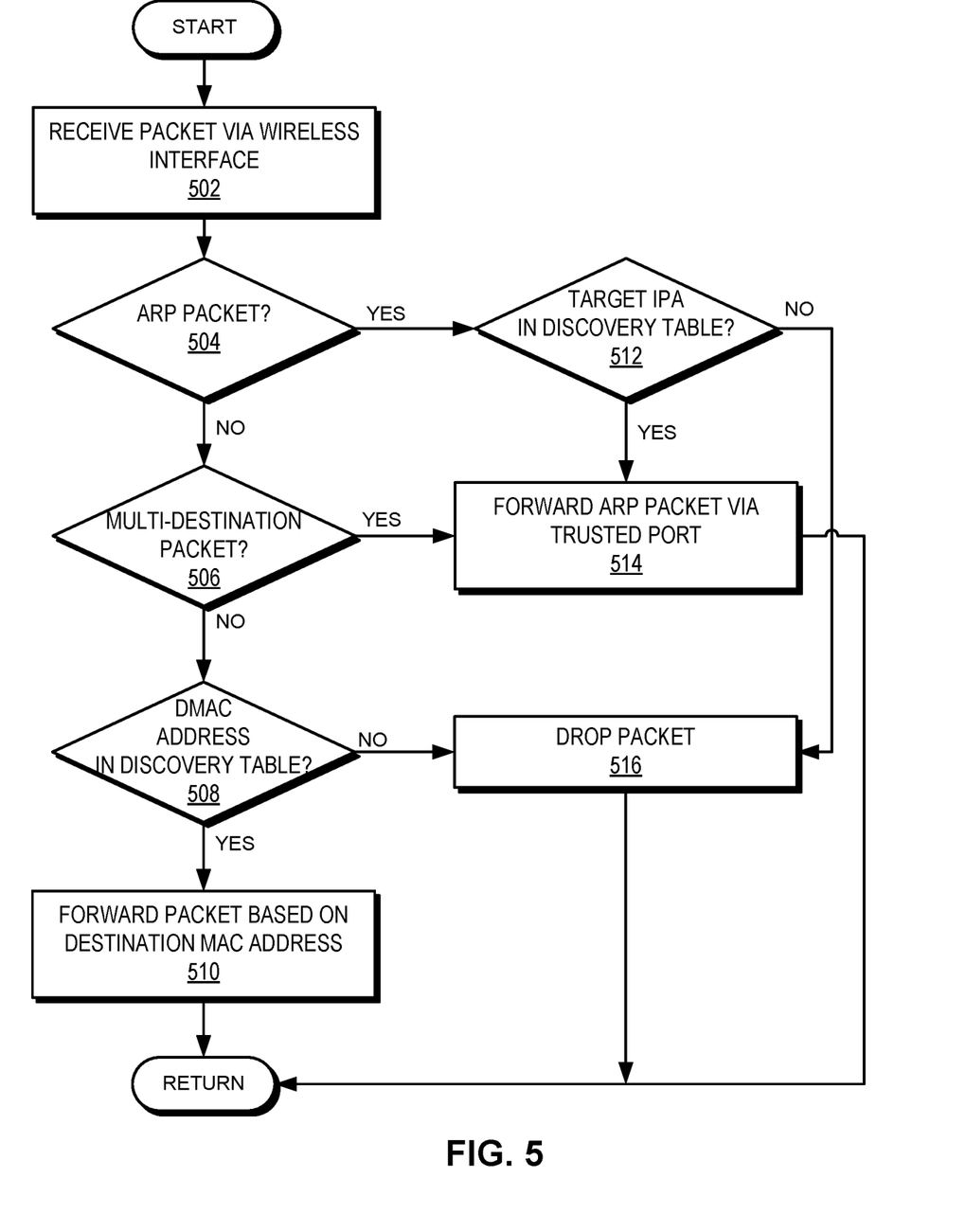
FIG. 5 presents a flowchart illustrating the process of an AP forwarding traffic received from a wireless interface based on a whitelist, in accordance with an aspect of the present application.

FIG. 5 presents a flowchart illustrating the process of an AP forwarding traffic received from a wireless interface based on a whitelist, in accordance with an aspect of the present application. During operation, the AP can receive a packet via a wireless interface (operation 502) and determine whether the packet is an ARP packet (operation 504). If the packet is an ARP packet, the AP can determine whether the target IP address of the ARP packet is in the discovery table (operation 512). On the other hand, if the packet is not an ARP packet, the AP can determine whether the packet is a multi-destination packet (operation 506).

If the target IP address of the ARP packet is in the discovery table (operation 512) or the packet is a multi-destination packet (operation 506), the AP can forward the ARP packet via a trusted port (operation 514). If the packet is not a multi-destination packet, the AP can determine whether the destination MAC address of the packet is in the discovery table (operation 508). If the target IP address of the ARP packet is not in the discovery table (operation 512) or the destination MAC address of the packet is not in the discovery table (operation 508), the AP can drop the packet (operation 516). If the destination MAC address of the packet is in the discovery table (operation 508), the AP can forward the packet based on the destination MAC address (operation 510).

Figure 6:
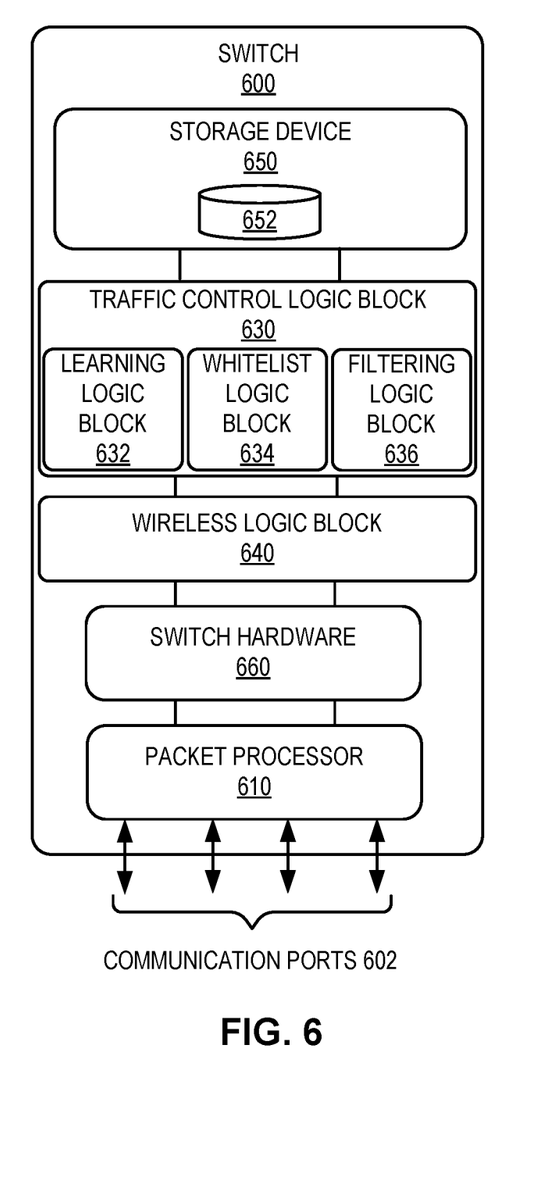
FIG. 6 illustrates an example of a switch that operates as an AP and supports intra-VLAN traffic filtering, in accordance with an aspect of the present application.

FIG. 6 illustrates an example of a switch that operates as an AP and supports intra-VLAN traffic filtering, in accordance with an aspect of the present application. In this example, a switch 600 can include a number of communication ports 602, a packet processor 610, and a storage device 650. Switch 600 can include a wireless logic block 640 that allows switch 600 to operate as an AP (e.g., AP 112 in FIG. 1). Switch 600 can also include switch hardware 660 (e.g., processing hardware of switch 600, such as its application-specific integrated circuit (ASIC) chips), which includes information based on which switch 600 processes packets (e.g., determines output ports for packets).

Switch hardware 660 can include circuitry for a wireless interface that allows switch 600 to communicate wirelessly based on a wireless technology. Examples of the wireless technology can include but are not limited to, the Institute of Electrical and Electronics Engineers (IEEE) 802.11 standards, a cellular technology (e.g., nth generation or nG cellular technology), Bluetooth, line-of-sight optical, and infrared. Packet processor 610 can extract and processes header information from the received packets. Packet processor 610 can identify a switch identifier (e.g., a MAC address and/or an IP address) associated with switch 600 in the header of a packet. Switch 600 can maintain a database 652 (e.g., in storage device 650). Database 652 can be a relational database and may run on one or more Database Management System (DBMS) instances. Database 652 can store information associated with routing, configuration, and interface of switch 600. Database 652 may store the local discovery table of switch 600.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header over a wired or wireless connection. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can include a traffic control logic block 630 that can facilitate intra-VLAN traffic filtering at switch 600. Filtering logic block 630 can include a learning logic block 632, a whitelist logic block 634, and a filtering logic block 636. Learning logic block 632 can learn the IP addresses of essential devices in a VLAN (or subnet) from control packets, such as DHCP ACK packets. Whitelist logic block 634 can store the learned IP addresses in the local discovery table. Learning logic block 632 can also refresh the IP addresses if they are already in the local discovery table. Traffic control logic block 630 can also allow an administrator to configure an IP address (and optionally, the corresponding MAC address) of a device in the VLAN in the local discovery table.

Learning logic block 632 can learn a MAC address associated with an IP address in the discovery table control packets, such as ARP response or GARP packets. Whitelist logic block 634 can store the learned MAC address in the local discovery table in association with the IP address. Learning logic block 632 can also refresh the MAC addresses if they are already in the local discovery table. Filtering logic block 636 can filter inter-VLAN traffic based on the local discovery table. For example, filtering logic block 636 can block unicast packets or ARP request packets between devices in the same VLAN if the addresses in the packets are not present in the local discovery table, thereby allowing the local discovery table as a whitelist for the filtering process.

One aspect of the present technology can provide an access point (AP) in an AP cluster capable of filtering traffic. During operation, the AP can identify a set of Internet Protocol (IP) addresses of permitted devices in a virtual local area network (VLAN) of the AP cluster from a first set of packets. Here, a respective AP in the AP cluster can wirelessly couple a client on the VLAN via a wireless interface. The client can obtain an IP address from a subnet associated with the VLAN. The AP can also identify a set of media access control (MAC) addresses corresponding to the set of IP addresses from a second set of packets. The AP can then generate a whitelist comprising the sets of IP and MAC addresses identified from the first and second sets of packets. The whitelist can indicate addresses of packets permitted to be forwarded via the wireless interface. The AP can identify a target IP address in an Address Resolution Protocol (ARP) request received at the AP. Subsequently, if the target IP address is absent in the whitelist, the AP can preclude the wireless interface from forwarding the ARP request to clients wirelessly coupled to the wireless interface and prevent malicious access to ARP requests in the AP cluster.

In a variation on this aspect, wherein the first set of packets includes a Dynamic Host Configuration Protocol (DHCP) acknowledgment (ACK) packet.

In a further variation, the AP can identify the set of IP addresses by identifying a set of fields associated with the permitted devices in the DHCP ACK packet and learning the set of IP addresses from the identified set of fields.

In a variation on this aspect, the second set of packets includes one or more of: an ARP response packet and a gratuitous ARP (GARP) packet.

In a further variation, the AP can identify the set of MAC addresses by identifying a sender IP address and a sender MAC address in the ARP response or GARP packet and determining whether the sender IP address is present in the whitelist. If the sender IP address is present in the whitelist, the AP can learn the sender MAC address.

In a variation on this aspect, the AP can obtain an IP address of a permitted device from a user and incorporate the obtained IP address into the whitelist.

In a variation on this aspect, the AP can include an uplink port coupled to a backbone connection to a gateway switch of the AP cluster. The uplink port can be configured as a trusted port of the AP.

In a further variation, upon receiving a multi-destination packet from a client wirelessly coupled to the wireless interface, the AP can forward the multi-destination packet via the uplink port and preclude the wireless interface from forwarding the multi-destination packet to other clients wirelessly coupled to the wireless interface.

In a variation on this aspect, upon receiving a unicast packet from a client wirelessly coupled to the wireless interface, the AP can determine whether a destination MAC address of the unicast packet is present in the whitelist. If the destination MAC address is absent in the whitelist, the AP can drop the unicast packet.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    identifying, by an access point (AP) of an AP cluster, an Internet Protocol (IP) address of a first permitted device in a virtual local area network (VLAN), wherein the AP wirelessly couples a client device by a wireless interface to the VLAN;
    adding, by the AP, an entry to a permitted list comprising IP addresses of permitted devices accessible in the VLAN, the added entry comprising an IP address of the first permitted device;
    determining, by the AP, whether a target IP address in an Address Resolution Protocol (ARP) request received at the AP is present in the permitted list;
    based on determining that the target IP address in the ARP request is present in the permitted list, forwarding, by the AP, the ARP request to the first permitted device;
    extracting, by the AP, a Media Access Control (MAC) address of the first permitted device from an ARP response sent by the first permitted device as a response to the ARP request;
    adding, by the AP, the MAC address of the first permitted device to the entry in the permitted list; and
    dropping, by the AP, a packet based on a determination that a MAC address in the packet is not present in the permitted list.

2. The method of claim 1, comprising:
    based on determining that the target IP address in the ARP request is not present in the permitted list, dropping, by the AP, the ARP request.

3. The method of claim 1, comprising:
   determining, by the AP, whether a sender IP address in the ARP response is present in the permitted list; and
   based on determining that the sender IP address is present in the permitted list, adding, by the AP, the MAC address from the ARP response to the entry in the permitted list.

4. The method of claim 1, wherein the AP includes an uplink port coupled to a backbone connection to a gateway switch, wherein the uplink port is configured as a trusted port of the AP.

5. The method of claim 4, further comprising, in response to receiving a multi-destination packet from the client device wirelessly coupled to the wireless interface:
   forwarding the multi-destination packet via the uplink port; and
   precluding the wireless interface from forwarding the multi-destination packet to other client devices wirelessly coupled to the wireless interface.

6. The method of claim 1, wherein the packet is a unicast packet from a client device wirelessly coupled to the wireless interface, and
   wherein the unicast packet is dropped by the AP based on a determination that a MAC address in the unicast packet is not present in the permitted list.

7. The method of claim 1, wherein the AP identifies the IP address of the first permitted device from a discovery packet sent by a discovery server as a response to an initial discovery process initiated by the client device with the discovery server.

8. The method of claim 7, wherein the discovery packet comprises a Dynamic Host Configuration Protocol (DHCP) acknowledgment (ACK) packet, and the AP identifies the IP address of the first permitted device from the DHCP ACK packet.

9. The method of claim 8, comprising:
   identifying, by the AP, a set of fields associated with multiple permitted devices in the DHCP ACK packet; and
   learning, by the AP, a set of IP addresses from the identified set of fields, the set of IP addresses including the IP address of the first permitted device and an IP address of a second permitted device.

10. A non-transitory computer-readable storage medium comprising instructions that when executed cause an access point (AP) of an AP cluster to:
    identify an Internet Protocol (IP) address of a first permitted device in a virtual local area network (VLAN), wherein the AP wirelessly couples a client device by a wireless interface to the VLAN;
    add an entry to a permitted list comprising IP addresses of permitted devices accessible in the VLAN, the added entry comprising an IP address of the first permitted device;
    determine whether a target IP address in an Address Resolution Protocol (ARP) request received at the AP is present in the permitted list;
    based on determining that the target IP address in the ARP request is present in the permitted list, forward the ARP request from the AP to the first permitted device;
    extract, at the AP, a Media Access Control (MAC) address of the first permitted device from an ARP response sent by the first permitted device as a response to the ARP request;
    add the MAC address of the first permitted device to the entry in the permitted list; and
    drop, at the AP, a packet based on a determination that a MAC address in the packet is not present in the permitted list.

11. The non-transitory computer-readable storage medium of claim 10, wherein the instructions when executed cause the AP to:
    based on determining that the target IP address in the ARP request is not present in the permitted list, drop, at the AP, the ARP request.

12. The non-transitory computer-readable storage medium of claim 10, wherein the instructions when executed cause the AP to:
    determine whether a sender IP address in the ARP response is present in the permitted list; and
    based on determining that the sender IP address is present in the permitted list, add the MAC address from the ARP response to the entry in the permitted list.

13. The non-transitory computer-readable storage medium of claim 10, wherein the AP includes an uplink port coupled to a backbone connection to a gateway switch, wherein the uplink port is configured as a trusted port of the AP.

14. The non-transitory computer-readable storage medium of claim 13, wherein the instructions when executed cause the AP to, in response to receiving a multi-destination packet from the client device wirelessly coupled to the wireless interface:
    forward the multi-destination packet via the uplink port; and
    preclude the wireless interface from forwarding the multi-destination packet to other client devices wirelessly coupled to the wireless interface.

15. The non-transitory computer-readable storage medium of claim 10, wherein the identifying by the AP of the IP address of the first permitted device is from a discovery packet sent by a discovery server as a response to an initial discovery process initiated by the client device with the discovery server.

16. The non-transitory computer-readable storage medium of claim 15, wherein the discovery packet comprises a Dynamic Host Configuration Protocol (DHCP) acknowledgment (ACK) packet, and the identifying by the AP of the IP address of the first permitted device is from the DHCP ACK packet.

17. The non-transitory computer-readable storage medium of claim 16, wherein the instructions when executed cause the AP to:
    identify a set of fields associated with multiple permitted devices in the DHCP ACK packet; and
    learn a set of IP addresses from the identified set of fields, the set of IP addresses including the IP address of the first permitted device and an IP address of a second permitted device.

18. An access point (AP) comprising:
    a hardware processor;
    a non-transitory storage medium storing instructions executable on the hardware processor to:
      identify an Internet Protocol (IP) address of a first permitted device in a virtual local area network (VLAN), wherein the AP wirelessly couples a client device by a wireless interface to the VLAN;
      add an entry to a permitted list comprising IP addresses of permitted devices accessible to the client device in the VLAN, the added entry comprising an IP address of the first permitted device;

determine whether a target IP address in an Address Resolution Protocol (ARP) request received at the AP is present in the permitted list;

based on determining that the target IP address in the ARP request is present in the permitted list, forward the ARP request from the AP to the first permitted device;

extract, at the AP, a Media Access Control (MAC) address of the first permitted device from an ARP response sent by the first permitted device as a response to the ARP request;

add the MAC address of the first permitted device to the entry in the permitted list; and drop, at the AP, a packet based on a determination that a MAC address in the packet is not present in the permitted list.

19. The AP of claim 18, wherein the identifying by the AP of the IP address of the first permitted device is from a Dynamic Host Configuration Protocol (DHCP) acknowledgment (ACK) packet sent by a DHCP server as a response to a DHCP process initiated by the client device with the DHCP server, and wherein the instructions are executable on the hardware processor to:

identify a set of fields associated with multiple permitted devices in the DHCP ACK packet; and learn a set of IP addresses from the identified set of fields, the set of IP addresses including the IP address of the first permitted device and an IP address of a second permitted device.

* * * * *